(12) United States Patent
Hiemstra et al.

(10) Patent No.: US 11,203,255 B2
(45) Date of Patent: Dec. 21, 2021

(54) PROTECTION DEVICE FOR A MOTOR VEHICLE INTERIOR

(71) Applicant: BOS GMBH & CO. KG, Ostfildern (DE)

(72) Inventors: David Hiemstra, Zeeland, MI (US); William Seabolt, Zeeland, MI (US); Christopher Driy, Zeeland, MI (US); Justin Boetsma, Zeeland, MI (US); Zoltan Bakonyi, Zeeland, MI (US); Everardo Hernandez, Rochester Hills, MI (US); Roberto Cabral, Rochester Hills, MI (US)

(73) Assignee: BOS GMBH & CO. KG, Ostfildern (DE)

( * ) Notice: Subject to any disclaimer, the term of this patent is extended or adjusted under 35 U.S.C. 154(b) by 114 days.

(21) Appl. No.: 16/612,118

(22) PCT Filed: May 8, 2018

(86) PCT No.: PCT/EP2018/061917
§ 371 (c)(1),
(2) Date: Feb. 3, 2020

(87) PCT Pub. No.: WO2018/206600
PCT Pub. Date: Nov. 15, 2018

(65) Prior Publication Data
US 2020/0164727 A1 May 28, 2020

Related U.S. Application Data

(60) Provisional application No. 62/504,688, filed on May 11, 2017.

(51) Int. Cl.
*B60J 7/00* (2006.01)
*B60Q 3/51* (2017.01)
(Continued)

(52) U.S. Cl.
CPC .............. *B60J 7/0015* (2013.01); *B60Q 3/51* (2017.02); *B60Q 3/62* (2017.02); *B60Q 3/74* (2017.02)

(58) Field of Classification Search
CPC . B60J 7/0015; B60Q 3/51; B60Q 3/62; B60Q 3/74
(Continued)

(56) References Cited

U.S. PATENT DOCUMENTS 7,731,275 B2   6/2010  Bergmiller et al.
8,002,340 B2   8/2011  Lee
(Continued)

FOREIGN PATENT DOCUMENTS

DE   8816505.1 U1   1/1990
DE   10204359 A1   10/2002
(Continued)

OTHER PUBLICATIONS

International Search Report issued in corresponding Application No. PCT/EP2018/061917 with English translation dated Aug. 16, 2018 (7 pages).

(Continued)

*Primary Examiner* — Laura K Tso
(74) *Attorney, Agent, or Firm* — Flynn Thiel, P.C.

(57) ABSTRACT

Protection device for a motor vehicle interior having a flexible fabric which is displaceable along a guide direction between a compact, stored rest position and a protection position, outstretched flat at least in sections, a guide device fixed to the vehicle, in a mounted state, on which the flexible fabric is guided in a linear manner along the guide direction. At least one luminous element is provided which is associated with the flexible fabric and which emits light onto the flexible fabric in an operating state. At least one carrier (Continued)

element is provided, the luminous element being positively joined thereby to the guide device.

20 Claims, 2 Drawing Sheets

(51) Int. Cl.
    *B60Q 3/62*             (2017.01)
    *B60Q 3/74*             (2017.01)

(58) Field of Classification Search
    USPC ........ 362/488, 490, 492; 160/370.22, 370.21
    See application file for complete search history.

(56) References Cited

U.S. PATENT DOCUMENTS

| | | | |
|---|---|---|---|
| 9,987,980 B2 | 6/2018 | Albert | |
| 2014/0226351 A1* | 8/2014 | Hernandez | B60J 7/0007 362/509 |
| 2016/0236548 A1* | 8/2016 | Ten-Jet-Foei | B60Q 3/64 |
| 2017/0028826 A1* | 2/2017 | Haumann | B60J 7/0023 |
| 2017/0158125 A1* | 6/2017 | Schuett | B60Q 3/60 |
| 2017/0297419 A1* | 10/2017 | Ten-Jet-Foei | B60J 7/067 |
| 2017/0305339 A1* | 10/2017 | Lin | G02B 6/0091 |
| 2019/0366814 A1* | 12/2019 | Renn | B60J 7/022 |

FOREIGN PATENT DOCUMENTS

| | | |
|---|---|---|
| DE | 102009044704 A1 | 2/2011 |
| DE | 102011103319 A1 | 12/2011 |
| DE | 202014009548 U1 | 4/2016 |
| DE | 102015210977 A1 | 12/2016 |
| EP | 2042361 A2 | 4/2009 |
| FR | 2948068 A1 | 1/2011 |
| FR | 2991931 A1 | 12/2013 |
| KR | 1020100020318 A | 2/2010 |

OTHER PUBLICATIONS

Written Opinion of International Searching Authority issued in corresponding Application No. PCT/EP2018/061917 dated Aug. 16, 2018 (7 pages).

German Office Action issued in corresponding German Application No. 11 2018 002 386.9 dated May 5, 2021 (7 pages).

* cited by examiner

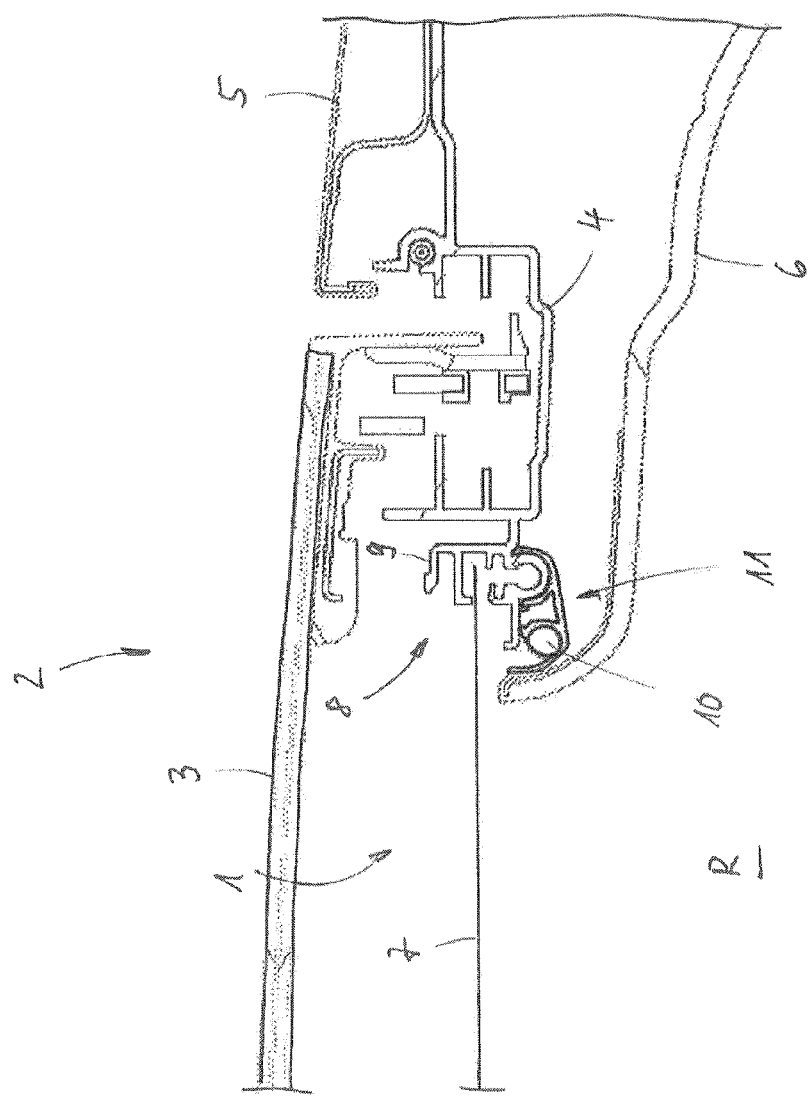
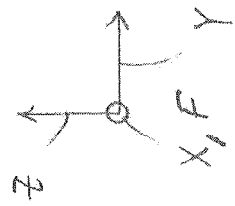

PROTECTION DEVICE FOR A MOTOR VEHICLE INTERIOR

CROSS-REFERENCE TO RELATED APPLICATIONS

This is the National Stage of International Application No. PCT/EP2018/061917, filed May 8, 2018, which claims the benefit of U.S. Provisional Application No. 62/504,688, filed May 11, 2017.

TECHNICAL FIELD

The invention relates to a protection device for a motor vehicle interior having a flexible fabric which is displaceable along a guide direction between a compact, stored rest position and a protection position, outstretched flat at least in sections, a guide device fixed to the vehicle in a mounted state and on which guide device the flexible fabric is guided in a linear manner along the guide direction, and at least one luminous element which is associated with the flexible fabric and which emits light onto the flexible fabric in an operating state.

BACKGROUND AND SUMMARY

Such a protection device is generally known in the form of a shading device for shading a side window, rear window or roof window of an automobile. The known shading device has a flexible fabric in the form of a roller blind web. The roller blind web is retained so as to be able to be wound onto and unwound from a winding shaft and is displaceable in a guide direction between a compact wound-up rest position and a flat unwound protection position. In the protection position, the roller blind web shades the corresponding side window, rear window or roof window. For displacement between the rest position and the protection position the roller blind web is guided in a linear manner in the guide direction on a guide device which is fixed to the vehicle. To this end, the roller blind web may be provided on the front end face with an extension profile which is supported in a linear movable manner on the guide device by means of sliding elements. Additionally, the known shading device has a luminous element which is assigned to the roller blind web. The luminous element is provided for illuminating the roller blind web.

It is the object of the invention to provide a protection device of the type mentioned in the introduction which has improved properties relative to the prior art and, in particular, permits simplified mounting and/or reduced noise development.

This object is achieved by at least one carrier element being provided, the luminous element being positively joined thereby to the guide device. By means of the solution according to the invention, a complex fastening of the luminous element to the protection device may be dispensed with. Instead, the carrier element permits a simple positive connection of the luminous element to the guide device. As a result, a separate fastening means, a screwed connection, an adhesively bonded connection or the like may be dispensed with. This permits particularly simple mounting of the luminous element on the protection device. Additionally, the carrier element permits improved noise behavior of the protection device, since undesired noise development is counteracted due to the positive connection. The carrier element serves for fastening the luminous element to the guide device, wherein the luminous element is fixed to the carrier element and the carrier element cooperates positively with the guide device. The carrier element may cooperate with the guide device, for example, in the form of a latching connection or snap connection. The protection device is preferably configured in the form of a shading device for a sliding roof system of an automobile and thus for shading a glass surface of the automobile on the roof side. The flexible fabric is preferably configured in the form of a roller blind web which—in a mounted state—is retained so as to be able to be wound onto and unwound from a rotatably mounted winding shaft which is fixed to the vehicle. The guide device preferably has two guide profiles which are arranged in the transverse direction of the flexible fabric on either side thereof and which are longitudinally extended in the guide direction parallel to one another. The flexible fabric may be supported so as to be guided in a linear manner on the guide device by means of an extension profile which on the front end face is connected fixedly to the flexible fabric. The luminous element assigned to the flexible fabric is preferably a light source or a light guide. The light source may be implemented, in particular, in the form of an LED array. The light guide is preferably configured in the form of a light strip or a light cable, in particular a fiber optic cable.

The solution according to the invention is suitable in a particularly preferred manner for a protection device in the form of a shading device for a sliding roof system of an automobile. The solution according to the invention may also be used, however, in the form of a shading device for a side window or rear window of an automobile or in the form of a separating device for the luggage compartment of an automobile.

In one embodiment of the invention, the luminous element is positively joined to the carrier element. This is a particularly advantageous embodiment of the invention since separate fastening means for connecting the luminous element to the carrier element may be dispensed with. The luminous element may cooperate with the carrier element, for example in the form of a latching connection or snap connection.

In a further embodiment of the invention, the carrier element has a first positive connecting portion which positively cooperates with a positive connecting element of the guide device such that a first snap connection is formed and/or the carrier element has a second positive connecting portion which positively cooperates with the luminous element such that a second snap connection is formed. The first snap connection may be configured, in particular, in the form of a snap hook connection, snap ball connection, snap ring connection or snap cylinder connection. The first snap connection may be configured to be releasable or non-releasable. Preferably, the first snap connection is configured to be releasable. In order to ensure a positive snap connection in accordance with requirements, the first positive connecting portion is preferably configured to be resiliently flexible. Alternatively or additionally, the positive connecting element of the guide device may be configured to be resiliently flexible. The second snap connection may be configured, in particular, in the form of a snap hook connection, a snap ball connection, snap ring connection or snap cylinder connection. In this case, the second snap connection may be configured to be releasable or non-releasable. Preferably, the second snap connection is configured to be releasable. In order to ensure a positive snap connection in accordance with requirements, the second positive connecting portion is preferably configured to be resiliently flexible. Alternatively or additionally, the luminous element may be configured to be resiliently flexible at least in sections. This is a particularly advantageous embodiment of the invention since particularly simple mounting is possible by means of the first snap connection and/or the second snap connection. Additionally, the first snap connection and/or the second snap connection counteract undesired noise development which may not otherwise be excluded, for example as a result of fastening means which are subject to play.

In a further embodiment of the invention, the first snap connection is configured in the form of a snap cylinder connection or snap ring connection and/or the second snap connection is configured in the form of a snap cylinder connection or a snap ring connection. Snap ring connections or snap cylinder connections are known in principle per se in the field of connecting technology. In this embodiment of the invention, the first positive connecting element is preferably configured in the form of a concave ring portion or cylinder portion and/or the positive connecting element of the guide device is preferably configured in the form of a convex ring portion or cylinder portion. For producing the first snap connection, the concave first positive connecting portion is snapped onto the convex positive connecting element by means of a resilient widening. The second positive connecting portion is preferably configured in the form of a concave ring portion or cylinder portion and/or the luminous element is preferably provided with a round, particular preferably circular, cross section. For producing the second snap connection the luminous element is pushed into the concave second positive connecting portion, wherein this second positive connecting portion is resiliently widened until the luminous element snaps into the second positive connecting portion. The first snap connection and/or the second snap connection are preferably configured without play.

In a further embodiment of the invention, the carrier element has an aperture portion, the luminous element emitting light through said aperture portion onto the flexible fabric. The aperture portion forms a type of diaphragm which controls the emission of light of the luminous element onto the flexible fabric. The aperture portion may be configured in the form of a slot, a bore or the like. Preferably, the aperture portion is configured in the form of an elongated slot extending substantially parallel to the guide direction. The longitudinal slot is preferably longitudinally extended over substantially the entire length of the flexible fabric in the protection position and/or substantially over the entire length of the guide device. By varying the dimensions of the aperture portion in terms of structure, the emission of light from the luminous element onto the flexible fabric may be influenced by simple means with regard to orientation, intensity, focusing or the like.

In a further embodiment of the invention, the carrier element has a channel portion, a supply line connected to the luminous element being arranged therein for the supply of energy and/or light thereto. The channel portion may be fully closed or partially open in cross section. The channel portion serves for laying the supply line in an organized manner and protects this supply line from damage. The supply line may be provided for supplying energy to the luminous element and thus may have an electrical conductor for the supply of voltage and/or current to the luminous element. Alternatively or additionally, the supply line may be provided for supplying light to the luminous element and thus may have a light guide, in particular a fiber optic cable. This is a particularly advantageous embodiment of the invention since the carrier element serves for guiding the line and/or protecting the line by means of the channel portion. Thus, a further improved functional integration is achieved.

In a further embodiment of the invention, the carrier element is configured in the form of a longitudinal profile and/or is arranged so as to be longitudinally extended substantially parallel to the guide direction. The longitudinal profile is preferably an extruded profile or extrusion profile. The longitudinal profile may be made from plastics material or metal. Preferably, the longitudinal profile is made from a plastics material which is configured to be resiliently flexible at least in sections. The longitudinal profile is preferably longitudinally extended over substantially the entire length of the guide device. If a first positive connecting portion and/or a second positive connecting portion are provided, these positive connecting portions are preferably configured to be longitudinally extended over the entire length of the longitudinal profile. In this case, both the first positive connecting portion and the second positive connecting portion may have a groove-shaped longitudinally extended path.

In a further embodiment of the invention, the longitudinal profile is preferably made in one piece from plastics material. The longitudinal profile may be made by means of a plastics injection-molding method or by means of an extrusion method. It is particularly advantageous if the longitudinal profile is configured in one piece. This is an embodiment of the invention which is able to be produced in a particularly cost-effective manner and which is simple to mount.

In a further embodiment of the invention, the luminous element is configured in the form of a longitudinally extended LED array or an optical fiber cable and/or is arranged so as to be longitudinally extended substantially parallel to the guide direction. Preferably, in this case the luminous element is positively joined to the carrier element substantially over its entire length. In other words: the second snap connection preferably extends substantially over the entire luminous element in the longitudinal direction and/or substantially over the entire length of the carrier element. The same preferably applies to the first snap connection.

The invention further relates to a carrier element for a protection device as described in the introduction, wherein the carrier element is configured according to the above embodiments.

Further advantages and features of the invention are disclosed in the claims and in the following description of a preferred exemplary embodiment which is shown with reference to the drawings.

BRIEF DESCRIPTION OF THE DRAWINGS

FIG. 1 shows a truncated, highly simplified sectional view of an embodiment of a protection device according to the invention in the form of a shading device for a sliding roof system of an automobile.

DETAILED DESCRIPTION

Figure 2:
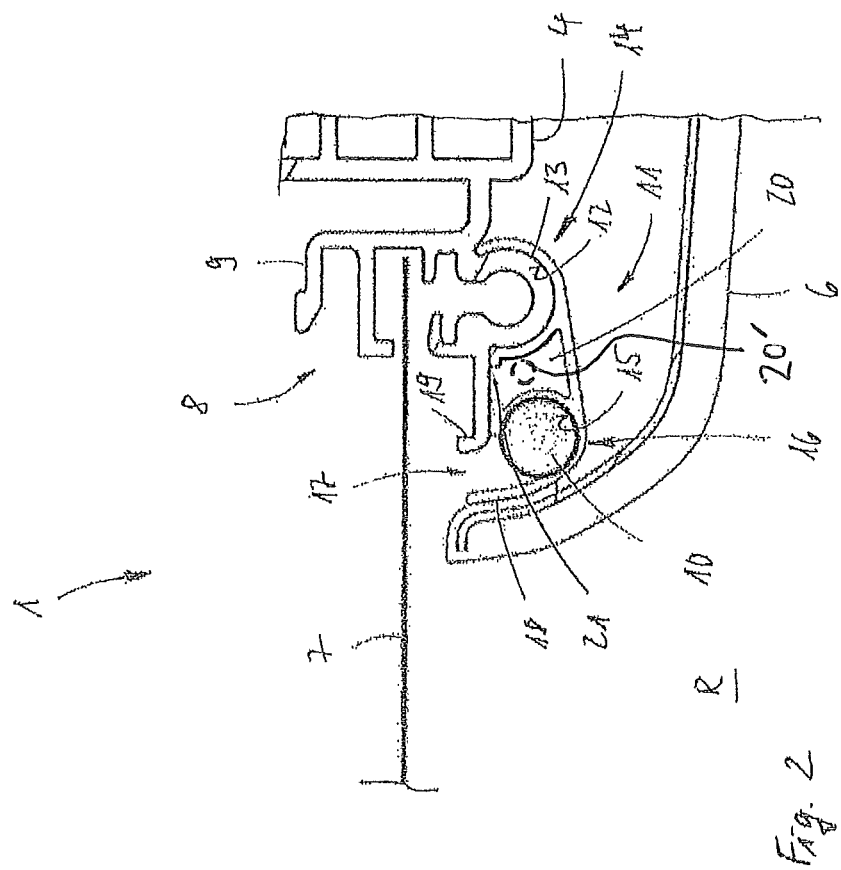
FIG. 2 shows an enlarged detailed view of the protection device according to FIG. 1 in the region of a carrier element.

According to FIG. 1 a protection device is configured in the form of a shading device 1 and arranged in the region of a sliding roof system 2 of an automobile, which is not shown in detail.

The sliding roof system 2 has a movable roof part 3. In a manner known in principle, the movable roof part 3 may be moved between a closed position and an open position and to this end is supported by means of a displacement mechanism, not described in more detail, in a linear movable manner on a guide rail 4 fixed to the vehicle. In the present case, the movable roof part is configured in the form of a glass component 3 and in this regard is translucent. The guide rail 4 is arranged so as to be longitudinally extended substantially parallel to a vehicle longitudinal direction X and, in a manner known in principle, fixed to the body and arranged in the vehicle vertical direction Z between a roof outer skin 5 and an inner trim part 6. The inner trim part in the present case is a vehicle internal roof lining 6.

The shading device 1 in the present case is provided for shading the glass component 3. Therefore, the incidence of light entering a vehicle interior R may be controlled by means of the shading device 1.

Both the sliding roof system 2 and the shading device 1 have a substantially symmetrical construction—relative to a parallel central longitudinal plane extending parallel to the X-Z plane. In this regard, the sliding roof system 2 in the present case has two guide rails 4 which are arranged so as to oppose one another in a vehicle transverse direction Y and which are longitudinally extended in parallel. In order to avoid repetition, in particular in connection with the shading device 1, only the components and portions visible with reference to FIGS. 1 and 2 are described in more detail, wherein a correspondingly symmetrical arrangement of the components and/or portions relative to the said central longitudinal plane is not expressly referenced every time.

The shading device 1 has a flexible fabric 7. The flexible fabric in the present case is configured in the form of a roller blind web 7 and is displaceable along a guide direction F between a compact, stored rest position and a protection position, outstretched flat at least in sections. The guide direction F in the present case extends substantially parallel to the vehicle longitudinal direction X and may have a linear path or a curved path at least in sections. The roller blind web 7 in the present case is retained so as to be able to be wound onto and unwound from a winding shaft, not visible in more detail. In this case, in a manner known in principle, the winding shaft is rotatably mounted and fixed to the vehicle. In a state wound onto the winding shaft, the roller blind web 7 adopts the rest position. In a state at least partially unwound from the winding shaft, the roller blind web 7 adopts the protection position. In the protection position (FIG. 1) the vehicle interior R is covered upwardly by means of the roller blind web 7 in the vehicle vertical direction Z relative to the glass component 3. Conversely, in the protection position the glass component 3 is covered downwardly by means of the roller blind web 7 in the vehicle vertical direction Z relative to the vehicle interior R. In other words: the glass component 3 and/or the vehicle interior R are shaded by means of the roller blind web 7. In this case, the roller blind web 7 may be displaceable, either manually or by means of a drive device not visible in more detail, in the guide direction F between the rest position and the protection position.

A guide device 8 is provided for guiding the displacement movement of the roller blind web 7 between the rest position and the protection position. In the present case the guide device 8 has a guide profile 9. It goes without saying that in the present case due to the symmetrical design of the shading device 1 a further guide profile, not shown in more detail, is provided opposingly in the vehicle transverse direction Y. The guide profile or rail 9 in the present case is integrally formed in one piece on the guide rail 4 of the sliding roof system 2 which, however, does not necessarily have to be the case. In one embodiment, not shown in more detail, the guide profile 9 may be made separately from the guide rail 4 and/or attached fixedly to the vehicle separately therefrom. The guide rail 9 is longitudinally extended in the vehicle longitudinal direction X. The roller blind web 7 is supported on the guide profile 9 by means of a sliding element, not visible in more detail, so as to be slidably and movably guided in a linear manner. To this end, the roller blind web 7 may be connected, for example, to a substantially dimensionally stable extension profile which is arranged on the front end face in the guide direction F, which is provided so as to be longitudinally extended in the vehicle transverse direction Y and which is provided on the front end face with sliding elements. In this case, the sliding elements may be positively guided in a slidably movable manner on corresponding guide surfaces of the guide profile 9.

Additionally, the shading device 1 has at least one luminous element 10 which is assigned to the roller blind web 7 and which emits light onto the roller blind web 7 in an operating state. In the present case, due to the symmetrical embodiment of the shading device 1 two luminous elements 10 are provided, said luminous elements being arranged so as to oppose one another in the vehicle transverse direction Y. By means of the luminous element 10 the roller blind web 7 may be illuminated at least in sections, namely in an outer, region facing in the vehicle transverse direction Y of the guide device 8. In this manner, the light conditions in the vehicle interior R may be influenced in terms of design and/or technical requirements. The luminous element in the present case is a light guide 10. The light guide is configured in the form of a light cable 10, in particular a fiber optic cable. In one embodiment, not shown in further detail, the luminous element may be implemented in the form of a light source, in particular an LED array. The luminous element 10 in the present case is longitudinally extended in the guide direction F and thus substantially over the entire length of the guide device 8 in the vehicle longitudinal direction X. This is not obligatory. Rather, in one embodiment not shown in more detail, instead of a continuously longitudinally extended luminous element 10, a plurality of luminous elements which are arranged in sections or at regular intervals may be provided, said luminous elements being arranged adjacent to one another in the vehicle longitudinal direction X.

Moreover, the shading device 1 comprises a carrier element 11. By means of the carrier element 11 the luminous element 10 is positively joined to the guide device 8. In the present case, this positive connection is effected by the guide rail 9. Due to the present symmetrical design of the shading device 1 at least two carrier elements are provided, said carrier elements being arranged opposite one another in the vehicle transverse direction Y and being spaced apart symmetrically from said central longitudinal plane. Further features of the carrier element 11 are visible, in particular, with reference to FIG. 2.

With reference to FIG. 2, it may be seen that firstly the carrier element 11 is positively joined to the guide profile 9 of the guide device 8. Secondly, the luminous element 10 is positively joined to the carrier element 11. In particular, particularly simple mounting is possible due to this embodiment, to be described in more detail below. Additionally, said positively joined connections counteract undesired noise development in a driving operation.

The carrier element 11 has a first positive connecting portion 12 which positively cooperates with a positive connecting element 13 of the guide device 8 such that a first snap connection 14 is formed. Additionally, the carrier element 11 has a second positive connecting portion 15 which positively cooperates with the luminous element 10 such that a second snap connection 16 is formed. In the cross-sectional view of FIG. 2, the first positive connecting portion 12 is configured in a concave annular manner. Accordingly, the positive connecting element 13 is configured in a convex annular manner. The second positive connecting portion 15 in the present case is also configured in a concave annular manner, wherein the luminous element 10 has a circular cylindrical cross section. The first positive connecting portion 12 and the positive connecting element 13 are adapted to one another with regard to their dimensions such that a connection without play is effected between the carrier element 11 and the guide device 8. The second positive connecting portion 15 and the luminous element 10 are adapted to one another with regard to their dimensions such that a connection without play is effected between the luminous element 10 and the carrier element 11. In order to ensure a functionally correct configuration of the first snap connection 14 and the second snap connection 16, the carrier element 11 is designed to be resiliently flexible at least in the region of the first positive connecting portion 12 and/or the second positive connecting portion 15. Due to this resiliently flexible embodiment of the carrier element 11, this carrier element—in brief—may be snapped onto the positive connecting element 13 and thus positively joined to the guide device 8. Accordingly, the luminous element 10—in brief—may be snapped into the second positive connecting portion 16, so that a positive joined connection is effected between the luminous element 10 and the carrier element 11.

In the present case, both the first snap connection 14 and the second snap connection 16 are configured in each case in the form of an annular snap ring connection—at least in the cross-sectional view of FIG. 2.

In the present case, the carrier element 11—relative to the vehicle vertical direction Z—is arranged on the lower face of the guide device 8 and between the roller blind web 7 and the internal trim 6.

Moreover, the carrier element 11 has an aperture portion 17. In the operating state, the luminous element emits light onto the roller blind web 7 through the aperture portion 17. The aperture portion 17 thus functions as a diaphragm. By adapting the dimensions of the aperture portion 17 in terms of structure, the incidence of light emitted by the luminous element 10 onto the roller blind web 7 may be adapted, in particular with regard to orientation and/or intensity. The aperture portion in the present case is a gap 17. The gap 17 is configured between an extension 18 of the carrier element 11 and a wall portion 19 of the guide profile 9.

Additionally, the carrier element 11 has a channel portion 20. A supply line 20', which is shown diagrammatically in dotted lines in FIG. 2, is connected to the luminous element 10, and is arranged in the channel portion 20. The supply line 20' may be provided for supplying energy and/or light to the luminous element 10. Since the luminous element 10 in the present case is a light guide, the supply line 20' serves for supplying light thereto. The channel portion 20 serves for guiding and protecting the supply line 20' in an organized manner. In this case, the channel portion 20 is provided with a through-hole 21 in the vehicle vertical direction Z. In the positively joined state, the through-hole 21 is, closed by means of the wall portion 19 of the guide profile 9.

It is further visible with reference to FIG. 2 that the extension 18 is supported on a wall portion of the inner trim 6, not described in more detail, facing the guide device 8.

The carrier element in the present case is configured in the form of a longitudinal profile 11. The longitudinal profile 11 is arranged so as to be longitudinally extended substantially parallel to the guide direction F. In this case, the longitudinal profile 11 extends substantially over the entire length of the guide device 8 and/or thus substantially over the entire length of the guide profile 9. However, this is not necessarily the case. In one embodiment, not shown in more detail, a plurality of longitudinal profiles 11 which are spaced apart from one another in the vehicle longitudinal direction X and shortened in comparison with the present embodiment may also be provided. The longitudinal profile 11 is made from plastics material. Additionally, the longitudinal profile 11 is configured in one piece. In the present case, the longitudinal profile 11 is produced as an extruded component.

Due to the design of the carrier element in the form of a longitudinal profile 11, both the first positive connecting portion 12 and the second positive connecting portion 15 are configured in each case to be longitudinally extended in the vehicle longitudinal direction X and/or in the guide direction F. In this case, the positive connecting portions 12, 15 extend substantially over the entire length of the longitudinal profile 11. The same applies to the aperture portion 17 and the channel portion 20. Accordingly, the positive connecting element 13 is also longitudinally extended in the vehicle longitudinal direction X and/or thus in the guide direction F. Thus, the first snap connection 14 is configured in the form of a snap cylinder connection. The same applies in the present case to the second snap connection between the second positive connecting portion 15 and the luminous element 10.

The invention claimed is:

1. A protection device for a motor vehicle interior, the protection device comprising:
   a flexible fabric which is displaceable along a guide direction between a compact and—stored rest position and a protection position, the flexible fabric being outstretched flat at least in sections in the protection position, the flexible fabric having respective side edges extending along the guide direction and being disposed in spaced-apart relation with one another in a direction transverse to the guide direction;
   a guide device fixed to the vehicle in a mounted state, the guide device including a pair of guide rails each extending along the guide direction, the guide rails being disposed along the respective side edges of the flexible fabric and being configured for supportively guiding the flexible fabric in a linear manner along the guide direction;
   at least one luminous element associated with the flexible fabric, the at least one luminous element emitting light onto the flexible fabric in an operating state and extending longitudinally along one of the side edges of the flexible fabric; and
   at least one carrier element joined to the guide rail disposed along the one side edge of the flexible fabric, the at least one luminous element being positively joined to the guide rail disposed along the one side edge of the flexible fabric by the at least one carrier element.

2. The protection device as claimed in claim 1, wherein the at least one luminous element is positively joined to the at least one carrier element.

3. The protection device as claimed in claim 1, wherein the guide rail disposed along the one side edge of the flexible fabric has a positive connecting element and the at least one carrier element has a first positive connecting portion positively cooperating with the positive connecting element such that a first snap connection is formed, and the at least one carrier element has a second positive connecting portion positively cooperating with the at least one luminous element such that a second snap connection is formed.

4. The protection device as claimed in claim 3, wherein the first snap connection is configured in the form of a snap cylinder connection or snap ring connection and in that the second snap connection is configured in the form of a snap cylinder connection or snap ring connection.

5. The protection device as claimed in claim 1, wherein the at least one carrier element has an aperture portion, the at least one luminous element emitting light through said aperture portion onto the flexible fabric.

6. The protection device as claimed in claim 1, wherein the at least one carrier element has a channel portion, and the protection device further comprises a supply line connected to the at least one luminous element and arranged in the channel portion for supplying energy or light to the at least one luminous element.

7. The protection device as claimed in claim 1, wherein the at least one carrier element is configured in the form of a longitudinal profile and is arranged so as to be longitudinally extended substantially parallel to the guide direction.

8. The protection device as claimed in claim 7, wherein the longitudinal profile is made in one piece from a plastics material.

9. The protection device as claimed in claim 1, wherein the at least one luminous element is configured in the form of a longitudinally extended LED array or a fiber-optic light guide, or is arranged so as to be longitudinally extended substantially parallel to the guide direction.

10. A carrier element for a protection device as claimed in claim 1.

11. The protection device as claimed in claim 1, wherein the at least one carrier element has a channel portion, and the protection device further comprises a supply line connected to the at least one luminous element and arranged in the channel portion for supplying energy and light to the at least one luminous element.

12. The protection device as claimed in claim 1, wherein the at least one carrier element is configured in the form of a longitudinal profile or is arranged so as to be longitudinally extended substantially parallel to the guide direction.

13. The protection device as claimed in claim 1, wherein the at least one luminous element is configured in the form of a longitudinally extended LED array or a fiber-optic light guide, and is arranged so as to be longitudinally extended substantially parallel to the guide direction.

14. The protection device as claimed in claim 1, wherein the at least one luminous element is disposed and configured to emit light onto the flexible fabric along at least the one side edge of the flexible fabric and in a direction transverse to the guide direction.

15. The protection device as claimed in claim 1, wherein the guide rails are parallel to one another and the flexible fabric is disposed therebetween, the flexible fabric being supported on the respective guide rails for sliding movement along the guide direction.

16. A protection device for a motor vehicle interior, said protection device comprising:

a flexible fabric displaceable along a guide direction between a compact and stored rest position and a protection position, at least some sections of said flexible fabric when in said protection position being outstretched and flat, said flexible fabric having a pair of longitudinal edges spaced-apart from one another in a direction transverse to the guide direction and each said longitudinal edge extending longitudinally along the guide direction;

a guide device including a pair of guide profiles extending longitudinally along the guide direction, said guide profiles being disposed in opposed relation with one another and spaced-apart from one another in a direction transverse to the guide direction with said flexible fabric being disposed between and supported on said guide profiles such that said longitudinal edges of said flexible fabric are guided by the respective said guide profiles during movement of said flexible fabric between the compact and stored rest position and the protection position;

at least one carrier element joined to one of said guide profiles; and at least one luminous element disposed to emit light onto said flexible fabric in an operating state of said at least one luminous element, said at least one luminous element extending longitudinally along one of said longitudinal edges of said flexible fabric, said at least one carrier element interconnecting said at least one luminous element to said one guide profile.

17. The protection device as claimed in claim 16, wherein said at least one luminous element extends longitudinally along said one longitudinal edge of said flexible fabric disposed adjacent and guided by said one guide profile and said guide profiles are oriented substantially parallel to the guide direction.

18. The protection device as claimed in claim 16, wherein said at least one carrier element has a first connecting portion configured to resiliently engage part of said one guide profile, and a second connecting portion configured to resiliently engage said at least one luminous element such that said at least one luminous element is fixed to said one guide profile.

19. The protection device as claimed in claim 16, wherein said at least one carrier element includes an aperture extending longitudinally along said one longitudinal edge of said flexible fabric disposed adjacent and guided by said one guide profile, and in the operating state said at least one luminous element emits light onto said flexible fabric through said aperture.

20. The protection device as claimed in claim 16, wherein said at least one carrier element and said at least one luminous element are both disposed below said flexible fabric in a mounted state of said protection device on a motor vehicle.

* * * * *